United States Patent [19]

Tanimura et al.

[11] Patent Number: 5,052,229
[45] Date of Patent: Oct. 1, 1991

[54] VORTEX FLOWMETER

[75] Inventors: Yoshihiko Tanimura, Kyoto; Hisato Ishikuro; Yasuo Tada, both of Himeji, all of Japan

[73] Assignees: Mitsubishi Jidosha Kogyo Kabushiki Kaisha; Mitsubishi Denki Kabushiki Kaisha, both of Tokyo, Japan

[21] Appl. No.: 527,506

[22] Filed: May 23, 1990

[30] Foreign Application Priority Data

May 23, 1989 [JP] Japan ................................. 1-129334
May 23, 1989 [JP] Japan ................................. 1-129335
May 23, 1989 [JP] Japan ................................. 1-129336
May 23, 1989 [JP] Japan ................................. 1-129337

[51] Int. Cl.$^5$ ............................................... G01F 1/32
[52] U.S. Cl. ................................................. 73/861.22
[58] Field of Search ............ 73/861.22, 861.23, 861.24

[56] References Cited

U.S. PATENT DOCUMENTS 4,397,192 8/1983 Mollet ............................ 73/861.22
4,696,193 9/1987 Nanba et al. ..................... 73/861.22

FOREIGN PATENT DOCUMENTS

57-67863 4/1982 Japan .
58-21517 2/1983 Japan .
61-34620 6/1986 Japan .

Primary Examiner—Herbert Goldstein
Attorney, Agent, or Firm—Sughrue, Mion, Zinn, Macpeak and Seas

[57] ABSTRACT

A vortex flowmeter for measuring the flow rate of a fluid flowing into a conduit, wherein a member 5a for disturbing the flow of the fluid is disposed upstream of a vortex generating column 3 for generating vortexes in the fluid to be measured, and upstream of a straightener 4 for uniforming the flow of the fluid into the conduit. The fluid flow is disturbed in both the flow direction and its orthogonal direction, and the generation of vortexes by the vortex generating column is facilitated, while the fluctuation of the generated vortexes is prevented.

15 Claims, 13 Drawing Sheets

VORTEX FLOWMETER

BACKGROUND OF THE INVENTION

1. Field of the Invention

The present invention relates to a vortex flowmeter to be used in an internal combustion engine of a vehicle or the like to measure the quantity of a fluid, particularly with large turbulence.

2. Description of the Related Art

When a vortex flowmeter is used in an internal combustion engine of a vehicle or the like, it is always installed downstream of an air cleaner of the engine, as disclosed in the Japanese Patent Application Laid Open No. 58-21517 (1983) or the Japanese Patent Publication No. 62-26686 (1987), for example. In such structure, it is impossible to measure from low to high flow rate, with high precision, since the fluid flow is unstable. To solve this problem, it is proposed in the Japanese Patent Application Laid Open No. 61-134620 (1986), for example, to enhance the stability of vortex generation by arranging a turbulence generating element for generating turbulence in a part of the fluid upstream of the vortex generating column.

In such method, however, as described in the Japanese Patent Application Laid Open No. 57-67863 (1982), for example, the turbulence generating element possesses such a strong effect as to correct the vortex generating frequency, that is, the flow characteristics determined by the shape and width of the vortex generating column. Therefore, when vortexes generated by the turbulence generating element tend to be columnar and periodic, so-called Karman's vortex, the effect of the turbulence generating element on the flow characteristics is significant, and a precision is demanded strictly in the dimensions and arrangement of the turbulence generating element.

SUMMARY OF THE INVENTION

The invention is devised to solve the above-discussed problems, and it is a first object of the invention to present a vortex flowmeter with high precision generating stable vortexes regardless of the flow rate of the fluid to be measured by disposing a member for disturbing the flow of the fluid to be measured upstream of the vortex generating column, and a member for dividing the disturbed flow into plural flows downstream of the member for disturbing the flow of the fluid, thereby preventing the disturbed flow of the fluid to be measured from influencing the flow characteristics of the vortexes generated by the vortex generating column.

The disturbing member may also be disposed upstream of a straightener for uniforming the flow of the fluid to be measured into a conduit.

It is a third object of the invention to present an inexpensive vortex flowmeter easy to assemble, with a small number of parts, without requiring particular members, by integrally forming a member to disturb the flow of the fluid to be measured with a member to regulate the flow rate of a sub-conduit, with a member for fixing a straightener to a conduit, or with a member disposed in order to lead the fluid to be measured into a conduit.

It is a fifth object of the invention to present a vortex flowmeter with high precision in generating stable vortexes regardless of the flow rate of the fluid to be measured, by disposing a member for leading the fluid to be measured outside a conduit into the conduit at the inlet of The above and further objects and features of the invention will more fully be apparent from the following detailed description with accompanying drawings.

DESCRIPTION OF THE PREFERRED EMBODIMENTS

Referring now to FIGS. 1-4 of the drawings, the vortex flowmeter is composed of a main conduit 1 and a sub-conduit 2 disposed in parallel with the main conduit 1. In the main conduit 1, a vortex generating column 3 is disposed approximately orthogonal to the flow direction, and is composed of an upstream vortex generating column 31 and a downstream vortex generating column 32 both disposed at proper spacing. At the opening of the inlet side of the main conduit 1, a honeycomb straightener 4 is provided. At the opening of the inlet side of the sub-conduit 2, a honeycomb straightener 7 is provided similarly. These straighteners 4, 7 are supported by a fixing member 5b and rivets 6. Upstream of the straightener 4, and in the same plane with the center of the vortex generating column 3, a turbulence generating element 5a is disposed in parallel therewith. An adjusting member 5c for regulating the cross-sectional area of water flow into the sub-conduit 7 is integrally formed with the fixing member 5b and turbulence generating element 5a.

Figure 1:
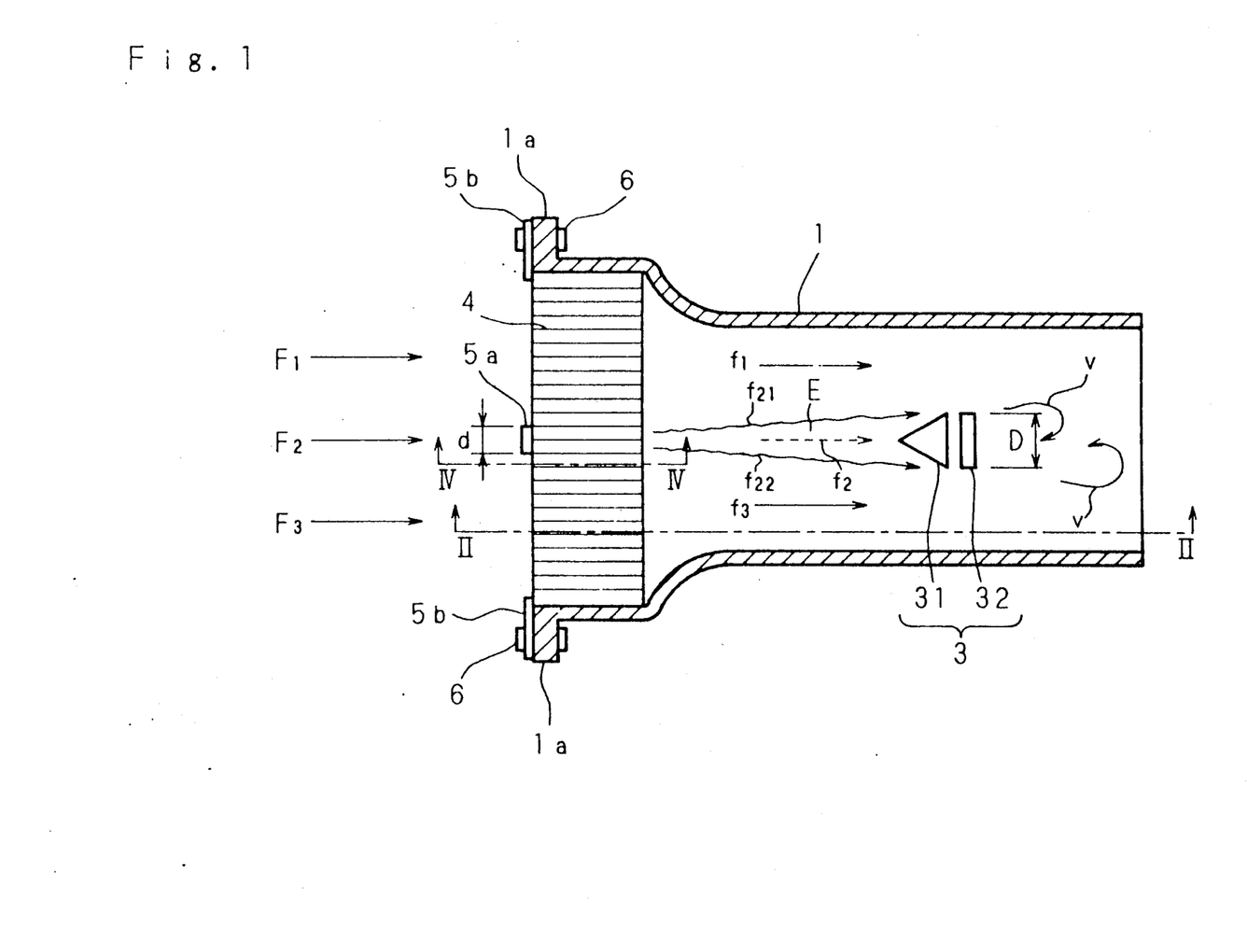
FIG. 1 is a cross-sectional view showing an embodiment of a vortex flowmeter of the invention.

The operation of this vortex flowmeter is described below. In FIG. 1, supposing that the fluid flows in the courses indicated by $F_1$ through $F_3$, the fluid just upstream of the vortex generating column 3 in the main conduit 1 flows in the courses indicated by $f_1$, $f_{21}$, $f_{22}$, $f_3$, and the Karman's vortexes v are generated downstream of the vortex generating column 3. Without the turbulence generating element 5a, the fluid would flow in the course $f_2$ indicated by a broken line parallel to the courses $f_1$, $f_3$, while with the turbulence generating element 5a the fluid in the course $F_2$ becomes a turbulent flow just downstream of the turbulence generating element 5a. The region E surrounded by the flowing courses $f_{21}$, $f_{22}$ is a turbulent region.

It is well known that a Karman's vortex street is likely to occur when there is turbulence in the fluid colliding against the vortex generating column 3. The state of turbulence in the turbulent region E mentioned above is described herein. Each of the vortexes generated downstream of the turbulence generating element 5a becomes a vortical column in section at right angles to the flow. The vortexes form so-called Karman's vortex streets. However, since the flow is divided in the cross-sectional direction at right angles to the flow by the straightener 4 immediately downstream of the turbulence generating element 5a, the vortical column is broken as is clear from the flow rate distribution indicated by $v_{f2}$ in FIG. 4. In the turbulent region E, therefore, the fluid is disturbed in both directions parallel and perpendicular to the flow. Accordingly, the turbulence generated by the turbulence generating element 5a only triggers the generation of the Karman's vortex streets by the vortex generating column 3, but does not affect the generating period of the Karman's vortex streets. Therefore, although the width d of the turbulence generating element 5a varies somewhat, the generating period of the Karman's vortex street determined by the vortex generating column 3 is not disturbed. Hence, it is unnecessary to enhance the dimensional precision of the turbulence generating element 5a.

Figure 5:
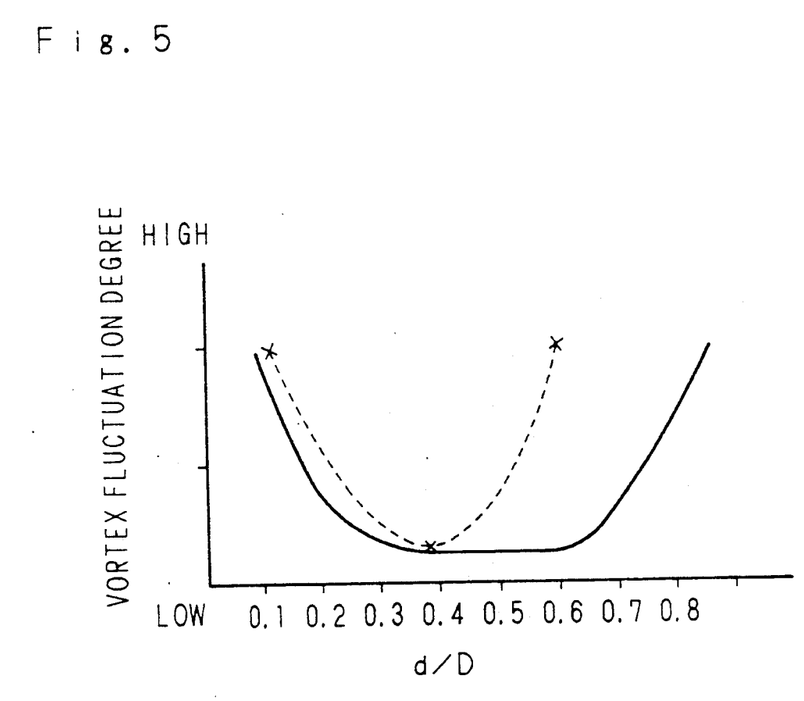
FIG. 5 is a graph showing the vortex fluctuation degree.

FIG. 5 shows the stability of the generating period of the Karman's vortex street, that is, the vortex fluctuation degree, determined by the dimension d of the turbulence generating element 5a and the dimension D of the vortex generating column 3. In this diagram, the solid line indicates the relation between d/D and the fluctuation degree by the invention, and the broken line denotes that of the conventional flowmeter.

Figure 2:
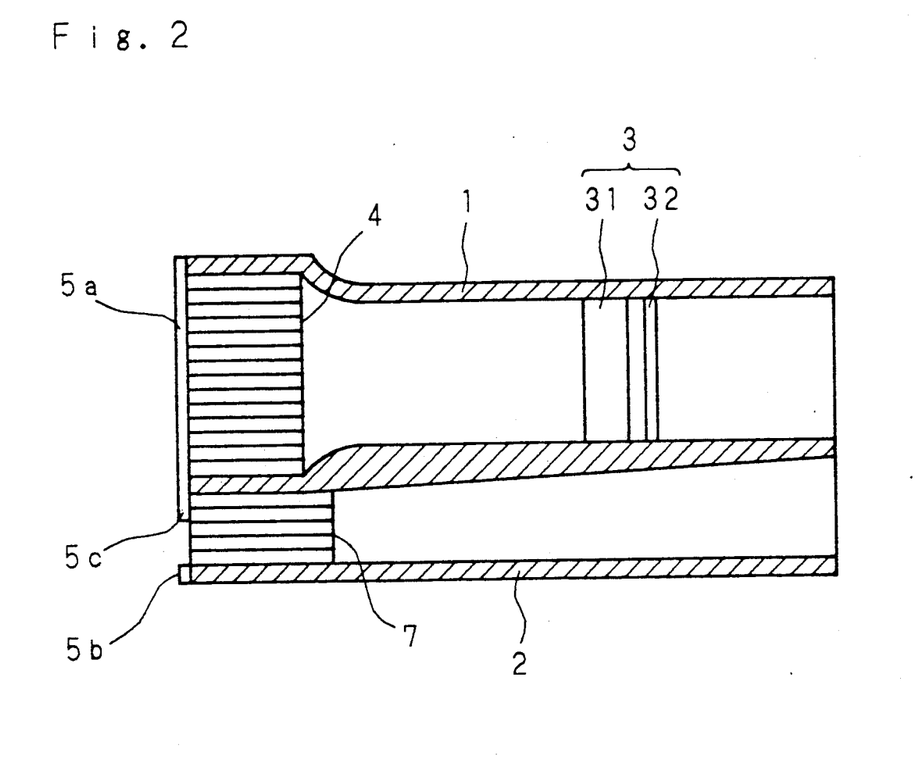
FIG. 2 is a sectional view taken along line II—II of FIG. 1.
Figure 3:
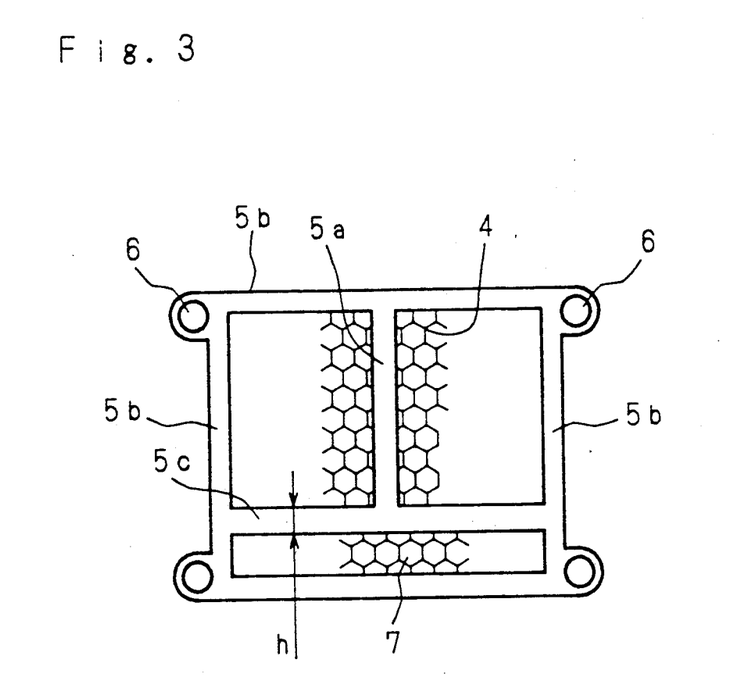
FIG. 3 is a front view of this vortex flowmeter from the inlet side.
Figure 4:
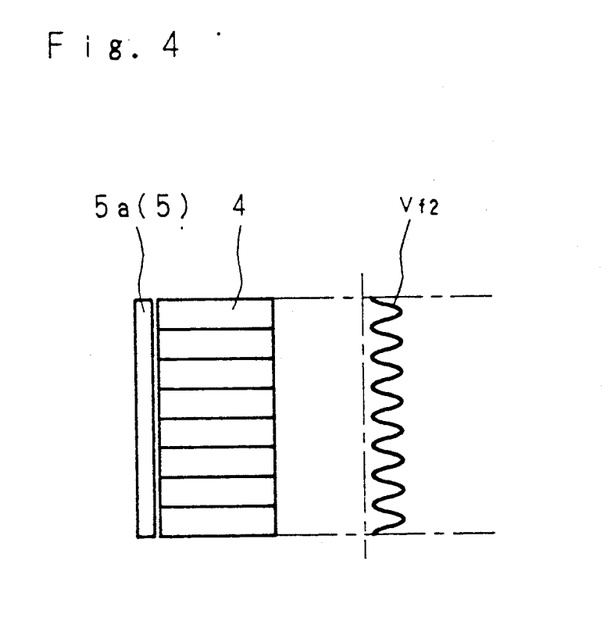
FIG. 4 is a sectional view taken along line IV—IV of FIG. 1.

As is clear from FIG. 2 and FIG. 3, the turbulence generating element 5a is integrally formed with the adjusting member 5c for regulating the cross-sectional area of water flow into the sub-conduit 2. This adjusting member 5c functions to shift the flow characteristics of the vortex flowmeter almost parallel to the sub-conduit 2, and is same as the one used generally, where the width h is the adjusting dimension as shown in FIG. 3. When the turbulence generating element 5a is integrally formed with the adjusting member 5c, the support member for the turbulence generating element 5a is not needed, and no special member is not needed for the turbulence generating element 5a.

The straightener 4 has a fixing member 5b which is supported by a flange 1a at an opening of the main conduit 1 and a flange 2a at an opening of the sub-conduit 2 by the rivets 6. The turbulence generating element 5a is integrally formed with the fixing member 5b. Therefore, the number of parts is notably reduced, and hence the fabrication and assembling of the vortex flowmeter is facilitated.

Figure 6A:
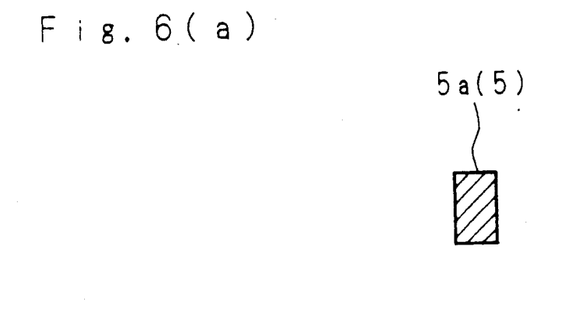
FIGS. 6(a) through 6(d) are sectional view of turbulence generating elements.
Figure 6B:
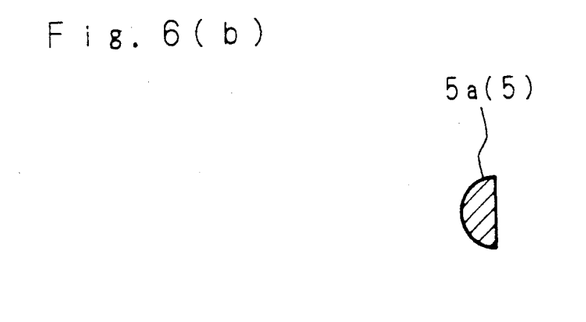
Figure 6C:
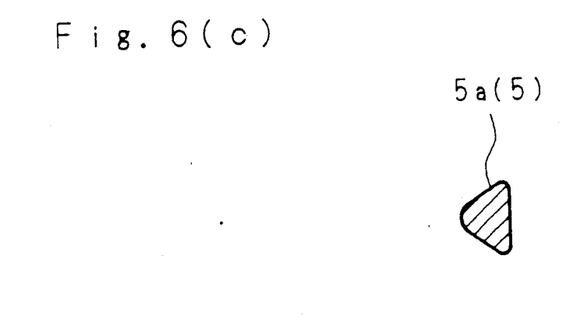
Figure 6D:
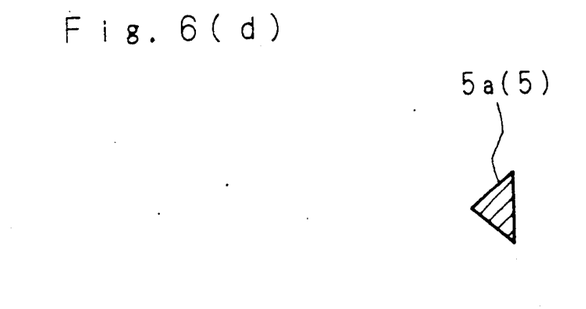

FIGS. 6(a) through 6(d) show various sectional shapes of the turbulence generating element 5a. In the rectangular form against the flow of the fluid as shown in FIG. 6(a), the fluid is most easily disturbed, but the pressure loss of the fluid is great, so that it is preferable to form convex parts facing upstream as shown in FIGS. 6(b) through (d), because the pressure loss is small.

Other embodiments of the invention are described below referring to the accompanying drawings.

Figure 7:
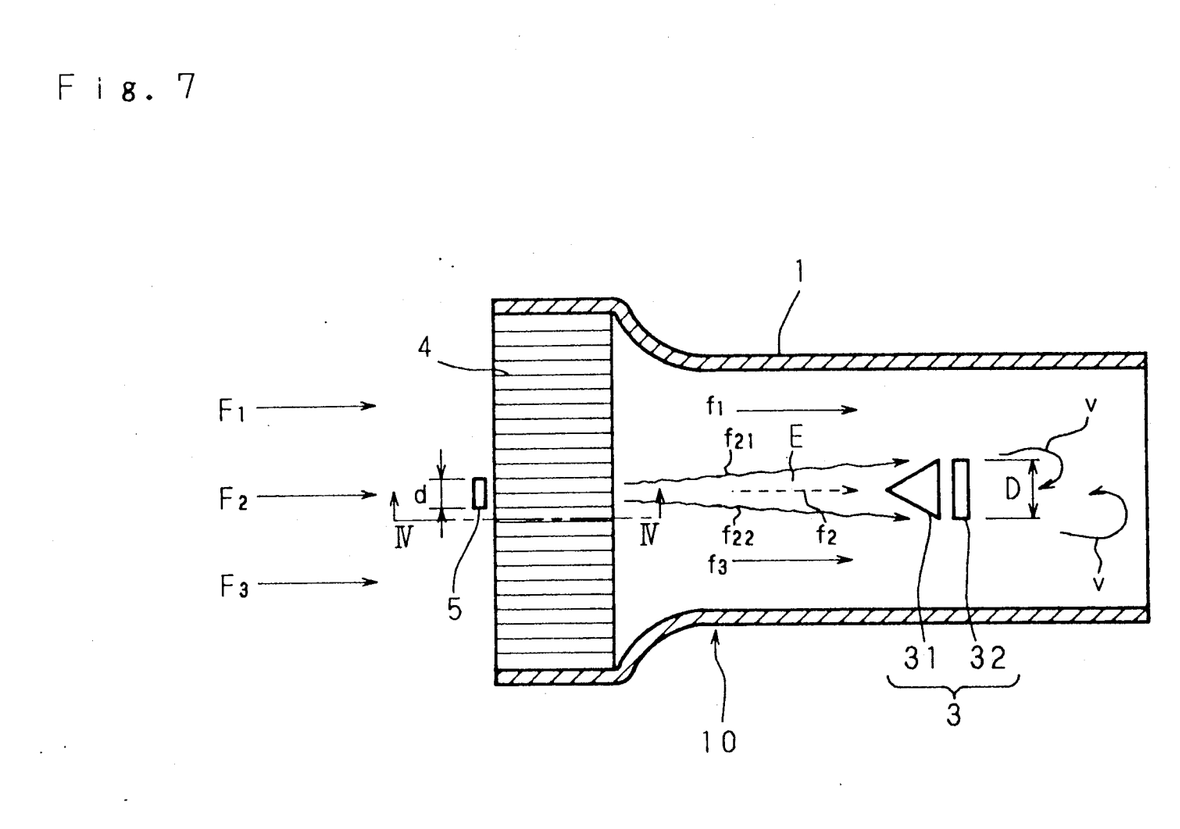
FIG. 7 is a cross-sectional view of another embodiment of a vortex flowmeter of the invention.
Figure 8:
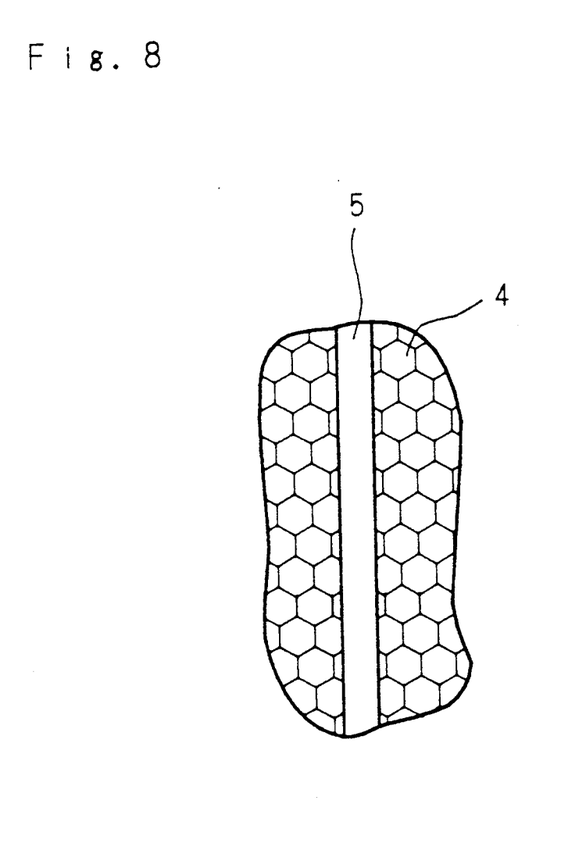
FIG. 8 is a front view of the vortex flow meter from the inlet side.

FIG. 7 is a cross-sectional view of a vortex flowmeter of the invention, and FIG. 8 is a partial front view of this vortex flowmeter from the inlet side. In the drawings, numeral 10 denotes an entire vortex flowmeter, and numeral 1 denotes a conduit in which the fluid to be measured flows. No bypass or sub-conduit 2 is provided, as in the FIGS. 1–4 embodiment. In the conduit 1, same as in the foregoing embodiment, disposed a vortex generating column 3 composed of an upstream vortex generating column 31 and a downstream vortex generating column 32. At the inlet of the conduit 1 upstream of the vortex generating column 3, and in the same plane with the axial line of the vortex generating column 3, a turbulence generating element 5 is disposed in parallel therewith. At the inlet portion of the conduit 1 downstream of the turbulence generating element 5, a honeycomb straightener 4 serving as a flow dividing means for the fluid to be measured is supported.

The operations of the turbulence generating element 5 and the straightener 4 in the vortex flowmeter 10 in such constitution are same as in the foregoing embodiment, and are not explained here again. The sectional shape of the turbulence generating element 5 may also be varied same as those of the turbulence generating element 5a shown in FIG. 6.

Figure 9:
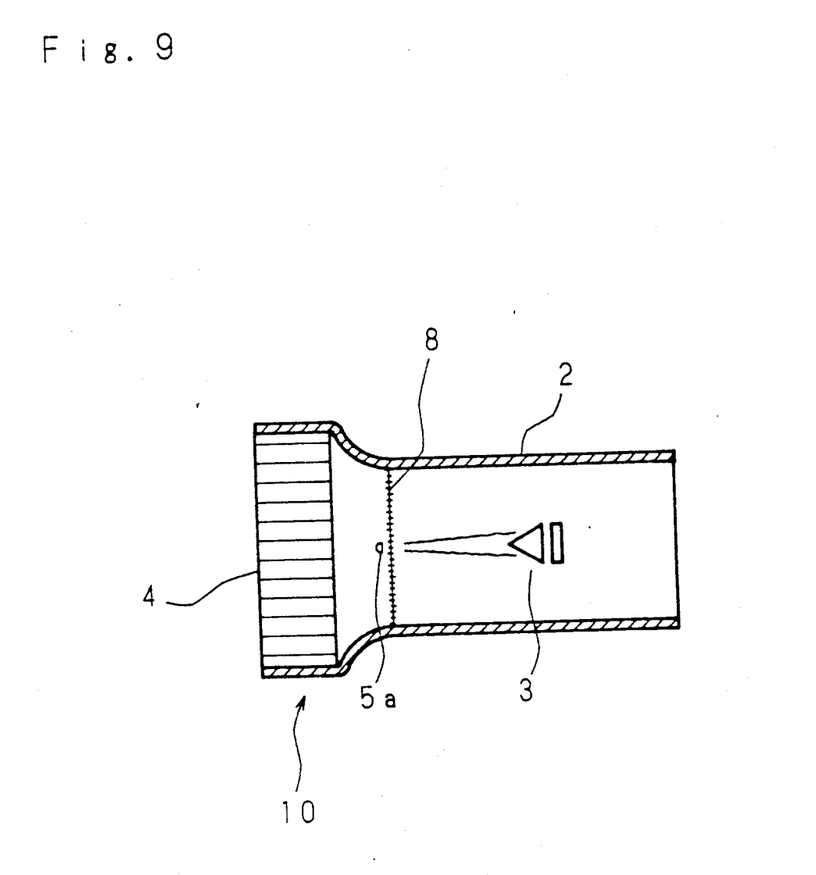
FIG. 9 is a cross-sectional view of another embodiment of a vortex flowmeter of the invention.
Figure 10:
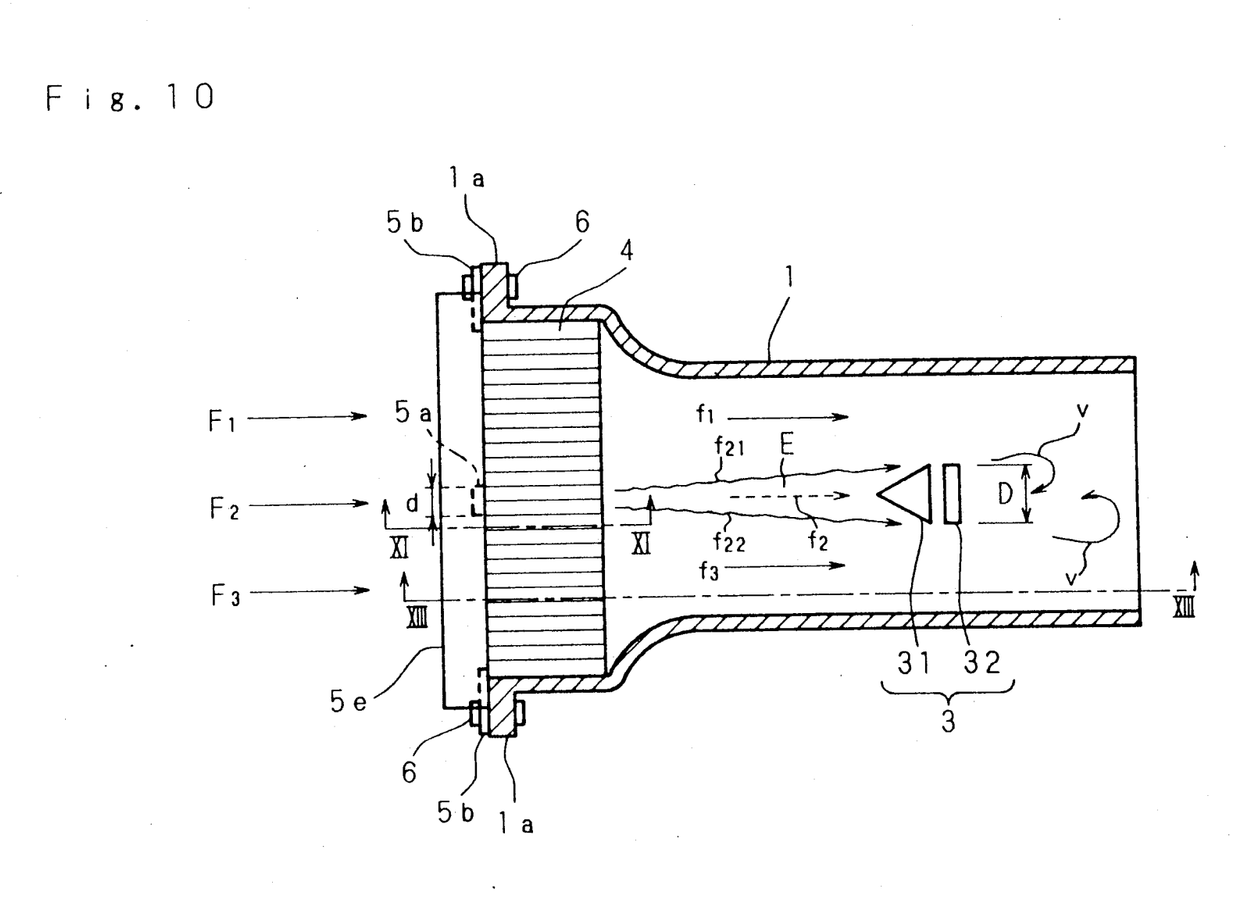
FIG. 10 is a cross-sectional view of another embodiment of a vortex flowmeter of the invention.

FIG. 9 shows another embodiment of the invention. In this embodiment, a turbulence generating element 5a is disposed in the downstream of the straightener 4, in parallel with the vortex generating column 3, and a reticulate straightener 8 is installed immediately downstream of the turbulence generating element 5a. In such constitution, the columnar vortexes generated by the turbulence generating element 5a are also broken by the straightener 8, so that stable Karman's vortex streets with less fluctuation may be obtained same as in the foregoing embodiments.

In these drawings, the same reference numbers denote the same or corresponding parts as in the foregoing embodiments, and are not explained again herein.

What differs in this embodiment is that a leading member 5e is installed to channel the flow of the fluid to be measured and lead it toward the inlet of the main conduit 1. The leading member 5e is integrally formed with the turbulence generating element 5a and adjusting member 5c.

Figure 11:
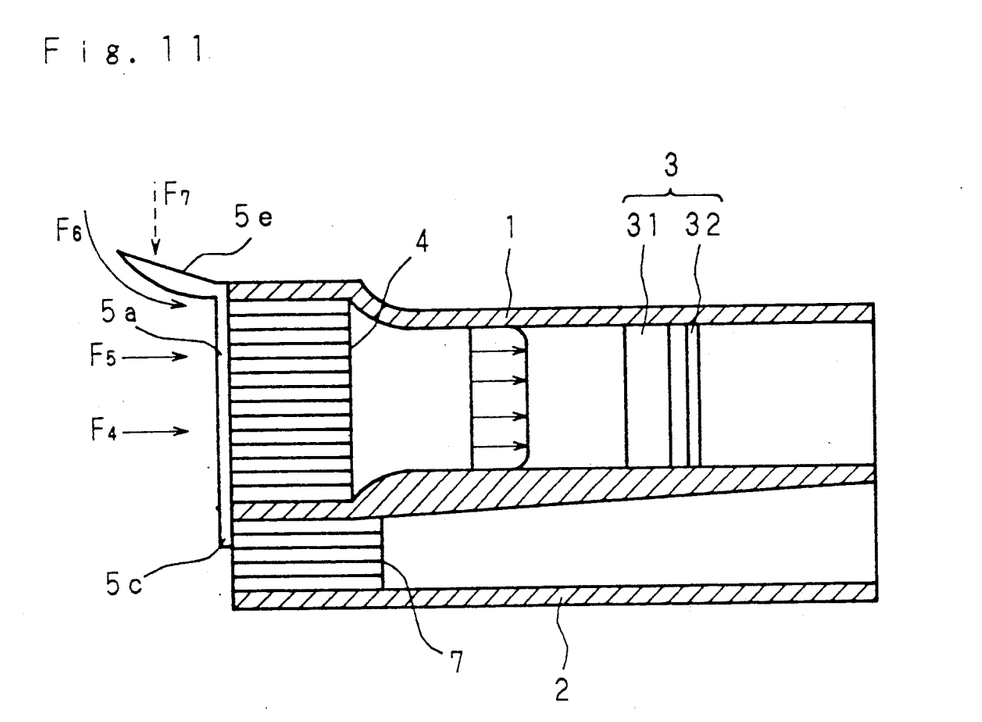
FIG. 11 is a sectional view taken along line XI—XI of FIG. 10.
Figure 12:
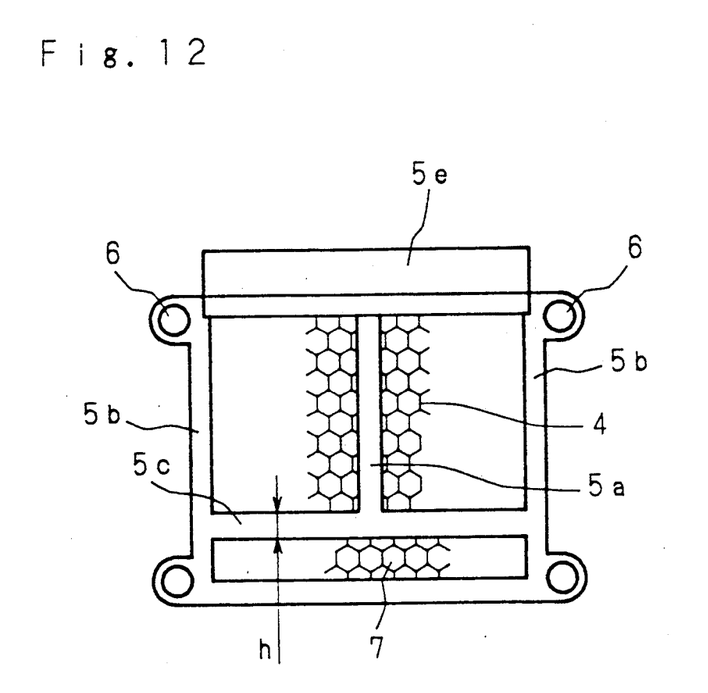
FIG. 12 is a front view of this vortex flowmeter from the inlet side.
Figure 13:
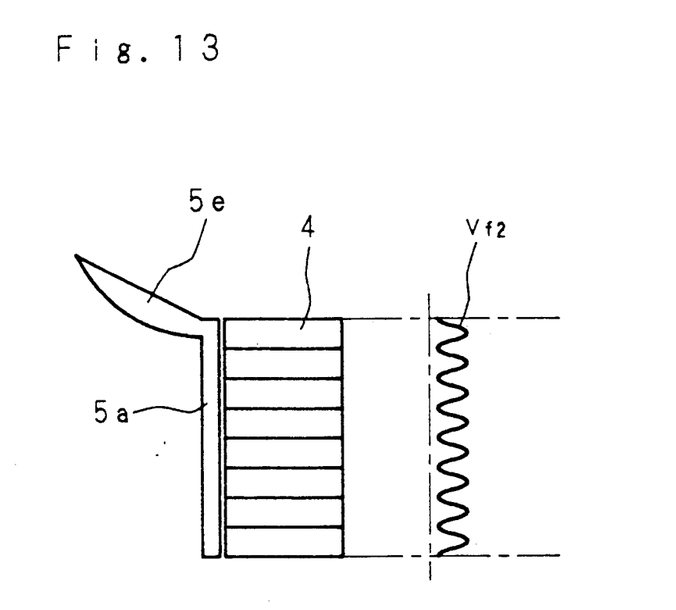
FIG. 13 is a sectional view taken along line XIII—XIII of FIG. 10.

When the fluid to be measured upstream of the straightener 4 is largely deviated, the leading member 5e obstructs the fluid flowing along the course $F_7$ as shown in FIG. 11, and changes the flow direction to be approximately parallel to courses $F_4$, $F_5$ as indicated by a course $F_6$, and also increases the flow rate. When the turbulence generating element 5a is integrally formed with the leading member 5e, a support member for supporting the turbulence generating element 5a is not needed, and no special member is needed for the turbulence generating element. Moreover, when also integrally formed with the fixing member 5b for fixing the straighteners 4, 7 and the adjusting member 5c, the number of parts may be significantly reduced, and fabrication and assembling are facilitated.

In the above embodiments, the straighteners 4, 7 are honeycomb, but the operations may be the same as the reticulate straightener or other forms.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A vortex flowmeter comprising:
a conduit in which the fluid to be measured flows,
a vortex generating column for generating the Karman's vortex street in the downstream of the fluid to be measured, being disposed inside said conduit in such a way that its axis is substantially perpendicular to the axis of said conduit,
a straightener with plural passages through which the fluid to be measured flows into said conduit, being disposed at the inlet of said conduit, and
a columnar turbulence generating element for disturbing the downstream flow of the fluid to be measured, being disposed substantially parallel to said vortex generating column, in the upstream of said straightener.

2. A vortex flowmeter as set forth in claim 1, wherein said turbulence generating element is a square column.

3. A vortex flowmeter as set forth in claim 1, wherein said turbulence generating element is a semicircular column with the cylindrical surface facing against the stream.

4. A vortex flowmeter as set forth in claim 1, wherein said turbulence generating element is a triangular prism with one edge facing against the stream.

5. A vortex flowmeter as set forth in claim 1, wherein said vortex generating column is composed of two parts disposed at a proper spacing in the flow direction of said fluid to be measured.

6. A vortex flowmeter as set forth in claim 1, wherein said straightener is honeycomb.

7. A vortex flowmeter as set forth in claim 1, wherein said straightener is reticulate.

8. A vortex flowmeter as set forth in claim 1, further comprising:
a sub-conduit for passing the fluid to be measured, together with said conduit, being disposed parallel to said conduit,
a straightener, being disposed at the inlet of said sub-conduit for dividing the flow of the fluid to be measured into plural flows, and
a regulating member for regulating the quantity of the fluid to be measured into said sub-conduit, being disposed at the inlet of said sub-conduit.

9. A vortex flowmeter as set forth in claim 8, wherein said regulating member is integrally formed with said turbulence generating element.

10. A vortex flowmeter as set forth in claim 1, further comprising:
a member for narrowing the course of the fluid to be measured toward the inlet of said conduit and leading the fluid to be measured outside said conduit toward said inlet.

11. A vortex flowmeter as set forth in claim 10, wherein said member is integrally formed with said turbulence generating element.

12. A vortex flowmeter as set forth in column 1, further comprising:
a fixing member for fixing said straightener to the inlet of said conduit.

13. A vortex flowmeter as set forth in claim 12, wherein said fixing member is integrally formed with said turbulence generating element.

14. A vortex flowmeter comprising:
a conduit in which the fluid to be measured flows,
a vortex generating column for generating the Karman's vortex street in the fluid to be measured in the downstream, being disposed inside said conduit in such a way that its axis is substantially perpendicular to the axis of said conduit,
a columnar turbulence generating element for disturbing the downstream flow of the fluid to be measured, being disposed substantially parallel to said vortex generating column, and in the upstream of said vortex generating column, and
a flow divider which divides the disturbed flow of the fluid to be measured into plural flows, having plural passages through which the fluid to be measured flows, being disposed between said turbulence generating element and said vortex generating column.

15. A vortex flowmeter as set forth in claim 14, wherein said flow divider is reticulate.

* * * * *

(12) REEXAMINATION CERTIFICATE (4424th)
United States Patent
Tanimura et al.

(10) Number: US 5,052,229 C1
(45) Certificate Issued: Aug. 28, 2001

(54) VORTEX FLOWMETER

(75) Inventors: Yoshihiko Tanimura, Kyoto; Hisato Ishikuro; Yasuo Tada, both of Himeji, all of (JP)

(73) Assignees: Mitsubishi Jidosha Kogyo Kabushiki Kaisha; Mitsubishi Denki Kabushiki Kaisha, both of Tokyo (JP)

Reexamination Request:
No. 90/005,390, Jun. 15, 1999

Reexamination Certificate for:
Patent No.: 5,052,229
Issued: Oct. 1, 1991
Appl. No.: 07/527,506
Filed: May 23, 1990

(30) Foreign Application Priority Data

May 23, 1989 (JP) .................................................. 1-129334
May 23, 1989 (JP) .................................................. 1-129335
May 23, 1989 (JP) .................................................. 1-129336
May 23, 1989 (JP) .................................................. 1-129337

(51) Int. Cl.[7] ............................................................ G01F 1/32
(52) U.S. Cl. .......................................................... 73/861.22
(58) Field of Search .......................... 73/861.22, 861.23, 73/861.24

(56) References Cited

U.S. PATENT DOCUMENTS 4,448,064 * 5/1984 Asayama ............................. 73/118.2

FOREIGN PATENT DOCUMENTS

5181154 * 7/1976 (JP) .
59194017 * 12/1984 (JP) .
6110718 * 1/1986 (JP) .
63180819 * 7/1988 (JP) .

* cited by examiner

*Primary Examiner*—Harshad Patel (57) ABSTRACT

A vortex flowmeter for measuring the flow rate of a fluid flowing into a conduit, wherein a member 5a for disturbing the flow of the fluid is disposed upstream of a vortex generating column 3 for generating vortexes in the fluid to be measured, and upstream of a straightener 4 for uniforming the flow of the fluid into the conduit. The fluid flow is disturbed in both the flow direction and its orthogonal direction, and the generation of vortexes by the vortex generating column is facilitated, while the fluctuation of the generated vortexes is prevented.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 14 are determined to be patentable as amended.

Claims 2–13 and 15, dependent on an amended claim, are determined to be patentable.

1. A vortex flowmeter comprising:

a conduit in which [the fluid to be measured] flows *a fluid that is measured*, a vortex generating column *disposed inside the conduit* for generating [the Karman's] *a Karman* vortex street in [the] *a* downstream *side* of the [fluid to be measured] *column*, [being disposed inside said conduit in such a way that its axis] *said vortex generating column having an axis which* is substantially perpendicular to [the] *a longitudinal* axis of said conduit, a straightener with plural passages *being disposed at an inlet of said conduit* through which the fluid [to be] *being* measured flows into said conduit, [being disposed at the inlet of said conduit,] and a columnar turbulence generating element for disturbing [the] *a* downstream flow of the fluid [to be] *being* measured[,] *and* being disposed substantially parallel to said vortex generating column, in [the] *an* upstream [side] of said straightener, *wherein said vortex generating column and said columnar turbulence generating element are aligned with each other in a direction that is substantially parallel to the longitudinal axis of said conduit.*

14. A vortex flowmeter comprising:

a conduit in which [the fluid to be measured] flows *a fluid that is measured*, a vortex generating column *disposed inside the conduit* for generating [the Karman's] *a Karman* vortex street in [the fluid to be measured in the] *a* downstream *side of the column*, [being disposed inside said conduit in such a way that its axis] *said vortex generating column having an axis which* is substantially perpendicular to [the] *a longitudinal* axis of said conduit, a columnar turbulence generating element for disturbing [the] *a* downstream flow of the fluid [to be] *being* measured[,] *and* being disposed substantially parallel to said vortex generating column, and in [the] *an* upstream of said vortex generating column, *wherein said vortex generating column and said columnar turbulence generating element are aligned with each other in a direction that is substantially parallel to the longitudinal axis of said conduit*, and a flow divider *being disposed between said turbulence generating element and said vortex generating column which divides the disturbed flow of the fluid* [to be] *being* measured into plural flows, *and* having plural passages through which the fluid [to be] *being* measured flows[, being disposed between said turbulence generating element and said vortex generating column].

* * * * *